United States Patent
Aagaard et al.

(10) Patent No.: US 11,181,950 B2
(45) Date of Patent: Nov. 23, 2021

(54) HINGED DEVICE

(71) Applicant: Microsoft Technology Licensing, LLC, Redmond, WA (US)

(72) Inventors: Karsten Aagaard, Monroe, WA (US); Errol Mark Tazbaz, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 259 days.

(21) Appl. No.: 16/044,023

(22) Filed: Jul. 24, 2018

(65) Prior Publication Data

US 2020/0033916 A1 Jan. 30, 2020

(51) Int. Cl.
*G06F 1/16* (2006.01)
*H04M 1/02* (2006.01)
*E05D 1/04* (2006.01)

(52) U.S. Cl.
CPC .......... *G06F 1/1681* (2013.01); *G06F 1/1618* (2013.01); *H04M 1/022* (2013.01); *E05D 1/04* (2013.01); *E05Y 2900/606* (2013.01); *Y10T 16/547* (2015.01)

(58) Field of Classification Search
CPC .... G06F 1/1681; G06F 1/1618; G06F 1/1652; G06F 1/1616; E05Y 2900/606; E05D 1/04; E05D 3/06; E05D 3/12; E05D 11/082; F16C 11/04; H04M 1/022; Y10T 16/54038; Y10T 16/547
USPC ............ 16/366, 342; 361/679.27; 455/575.3; 379/433.13
See application file for complete search history.

(56) References Cited

U.S. PATENT DOCUMENTS

| | | | |
|---|---|---|---|
| 3,525,483 A | 8/1970 | Alstyne | |
| 3,733,758 A | 5/1973 | Maier et al. | |
| 5,509,747 A | 4/1996 | Kiendl | |
| 6,834,834 B2 | 12/2004 | Dazet et al. | |
| 7,328,481 B2 | 2/2008 | Barnett | |
| 7,520,028 B2 | 4/2009 | Borleis et al. | |
| 8,365,359 B2 | 2/2013 | Morishita et al. | |
| 8,959,714 B2 | 2/2015 | Hsu | |
| 8,959,715 B2* | 2/2015 | Hsu ......................... | E05D 7/00 16/302 |

(Continued)

FOREIGN PATENT DOCUMENTS

| | | |
|---|---|---|
| EP | 2149663 A1 | 2/2010 |
| EP | 3155497 A1 | 4/2017 |
| WO | 2015191408 A1 | 12/2015 |

OTHER PUBLICATIONS

"Non-Final Office Action Issued in U.S. Appl. No. 16/174,705", dated Jan. 24, 2020, 12 Pages.

(Continued)

*Primary Examiner* — William L Miller
(74) *Attorney, Agent, or Firm* — Rainier Patents, P.S.

(57) ABSTRACT

The description relates to hinged devices, such as hinged computing devices. One example can include first and second device portions and a hinge assembly that includes spaced-apart parallel first and second hinge shafts. The first portion rotatably secured relative to the first hinge shaft and the second portion rotatably secured relative to the second hinge shaft. A tensioned synchronizing element synchronizes rotation of the first portion around the first hinge shaft to rotation of the second portion around the second hinge shaft.

16 Claims, 15 Drawing Sheets

(56) References Cited

U.S. PATENT DOCUMENTS

| | | |
|---|---|---|
| 8,959,719 B2 | 2/2015 | Hsu |
| 9,242,744 B2 | 1/2016 | Baudasse et al. |
| 9,964,989 B2 | 5/2018 | Krivoy et al. |
| 10,301,858 B2 * | 5/2019 | Maatta ............... E05D 11/0081 |
| 10,501,973 B2 * | 12/2019 | Maatta ................. G06F 1/1681 |
| 10,564,681 B2 * | 2/2020 | Siddiqui .................. E05D 7/00 |
| 10,641,318 B2 * | 5/2020 | Siddiqui .............. G06F 1/1616 |
| 10,747,271 B2 * | 8/2020 | Lin ........................ E05D 3/122 |
| 2010/0024169 A1 | 2/2010 | Self |
| 2011/0000136 A1 | 1/2011 | Brun |
| 2011/0157780 A1 | 6/2011 | Wang et al. |
| 2013/0135809 A1 * | 5/2013 | Uchiyama ............ G06F 1/1681 |
| | | 361/679.09 |
| 2013/0322004 A1 * | 12/2013 | Park ..................... G06F 1/1637 |
| | | 361/679.27 |
| 2014/0042293 A1 | 2/2014 | Mok et al. |
| 2014/0223694 A1 * | 8/2014 | Hsu .......................... E05D 7/00 |
| | | 16/302 |
| 2014/0290008 A1 * | 10/2014 | Hsu ....................... G06F 1/1681 |
| | | 16/386 |
| 2014/0338482 A1 | 11/2014 | Hsu et al. |
| 2015/0378400 A1 | 12/2015 | Sprenger et al. |
| 2017/0139445 A1 * | 5/2017 | Yuan ..................... G06F 1/1681 |
| 2017/0185104 A1 | 6/2017 | Krivoy et al. |
| 2017/0356225 A1 * | 12/2017 | Maatta ................. H04M 1/022 |
| 2017/0357294 A1 | 12/2017 | Siddiqui et al. |
| 2018/0166842 A1 * | 6/2018 | Siddiqui ............... G06F 1/1681 |
| 2018/0341288 A1 | 11/2018 | Senatori |
| 2018/0356858 A1 * | 12/2018 | Siddiqui ............... H04M 1/022 |
| 2018/0363341 A1 * | 12/2018 | Siddiqui ............... H04M 1/022 |
| 2019/0094917 A1 * | 3/2019 | Schmelzle .......... E05D 11/0081 |
| 2019/0155344 A1 * | 5/2019 | Lin ....................... G06F 1/1681 |
| 2019/0278338 A1 * | 9/2019 | Siddiqui ................. F16C 11/04 |
| 2019/0301215 A1 * | 10/2019 | Siddiqui ............... G06F 1/1681 |
| 2020/0133349 A1 * | 4/2020 | Aagaard .................. E05D 3/06 |

OTHER PUBLICATIONS

"International Search Report and Written Opinion Issued in PCT Application No. PCT/US19/056411", dated Jan. 13, 2020, 11 Pages.
"International Search Report and Written Opinion Issued In PCT Application No. PCT/US19/037850", dated Sep. 13, 2019, 12 Pages.

* cited by examiner

HINGED DEVICE

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced. Where space permits, elements and their associated reference numbers are both shown on the drawing page for the reader's convenience. Otherwise, only the reference numbers are shown.

DESCRIPTION

The present concepts relate to devices, such as computing devices employing hinge assemblies. The hinge assemblies can rotationally secure first and second device portions relative to hinge axes, such as a first hinge axis that relates to the first portion and a second hinge axis that relates to the second portion. Some of the present hinge assemblies can be synchronized such that rotation around one hinge axis is accompanied by the same amount of symmetrical rotation around the other hinge axis. This aspect can be achieved with a synchronizing element that can be manifest as a tensioned cord.

Figure 1:
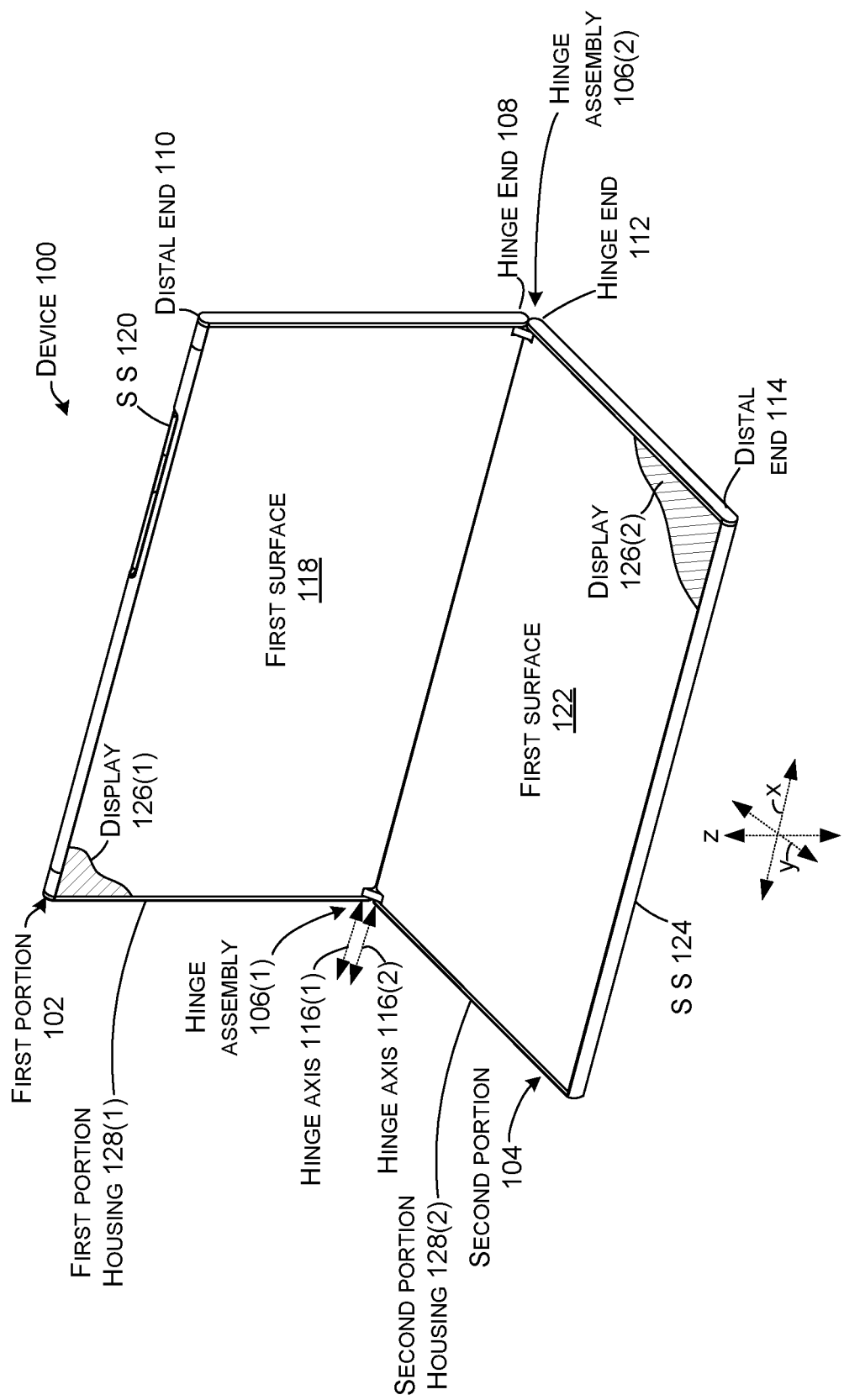
FIGS. 1, 2A, 4A, 8A-8D, and 9A-9C show perspective views of example devices in accordance with some implementations of the present concepts.

Introductory FIG. 1 shows an example device 100 that has first and second portions 102 and 104 that are rotatably secured together by synchronizing hinge assemblies 106. In the illustrated implementation, two hinge assemblies 106(1) and 106(2) are employed, but other implementations could employ a single hinge assembly or more than two hinge assemblies.

The first portion 102 can extend from a hinge end 108 to a distal end 110. The second portion 104 also can extend from a hinge end 112 to a distal end 114. The hinge assemblies 106 can define two hinge axes 116. The first portion 102 can rotate around first hinge axis 116(1) and the second portion 104 can rotate around second hinge axis 116(2). The synchronizing hinge assemblies 106 can synchronize rotation of the first and second portions (e.g., 20 degrees of rotation of the first portion 102 around the first hinge axis 116(1) is accompanied by 20-degrees of rotation of the second portion 104 around the second hinge axis 116(2).

The first portion 102 can include opposing first and second major surfaces 118 and 120 (hereinafter, first and second surfaces). Similarly, the second portion 104 can include opposing first and second major surfaces 122 and 124 (hereinafter, first and second surfaces). (Note the second surfaces 120 and 124 are facing away from the viewer and as such are not directly visible in this view).

In some implementations, displays 126 are supported by housing 128 (e.g., first portion housing 128(1) and second portion housing 128(2)). For example, the displays 126 can be positioned on the first and/or second surfaces 118, 120, 122, and/or 124, respectively. In the illustrated configuration, the displays 126 are positioned on first surfaces 118 and 122, respectively. The hinge assemblies 106 can also be connected to the housing 128 to synchronize rotation of the first and second portions 102 and 104. Conductors (not shown) can pass from the first portion to the second portion, such as through the hinge assemblies to electrically connect elements of the two portions.

FIGS. 2A-5E collectively show details of example synchronizing hinge assembly 106(1).

Figure 2A:
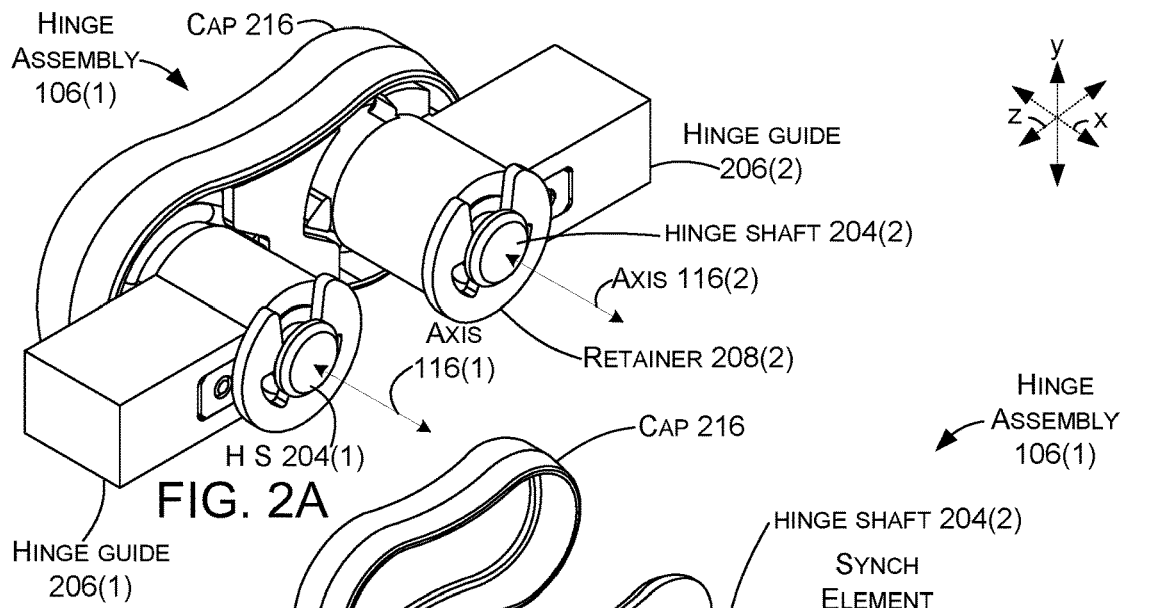
Figure 2B:
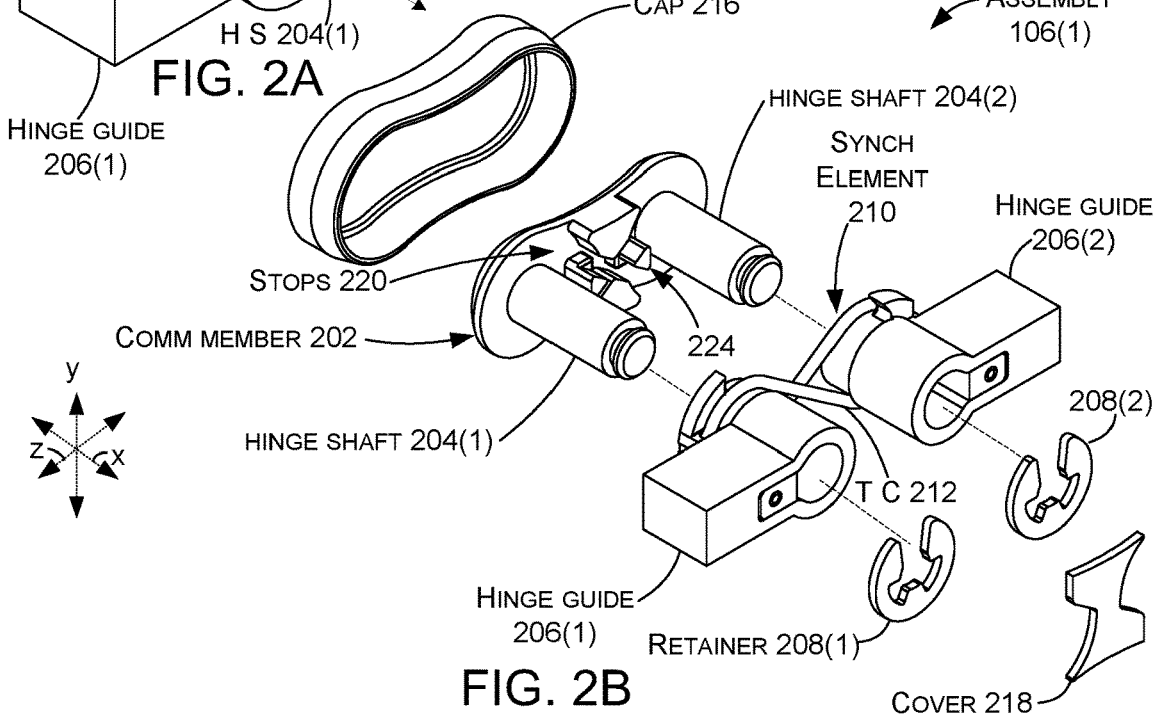
FIGS. 2B, 2C, 4B, 4C, 6, and 7 show exploded perspective views of example devices in accordance with some implementations of the present concepts.
Figure 2C:
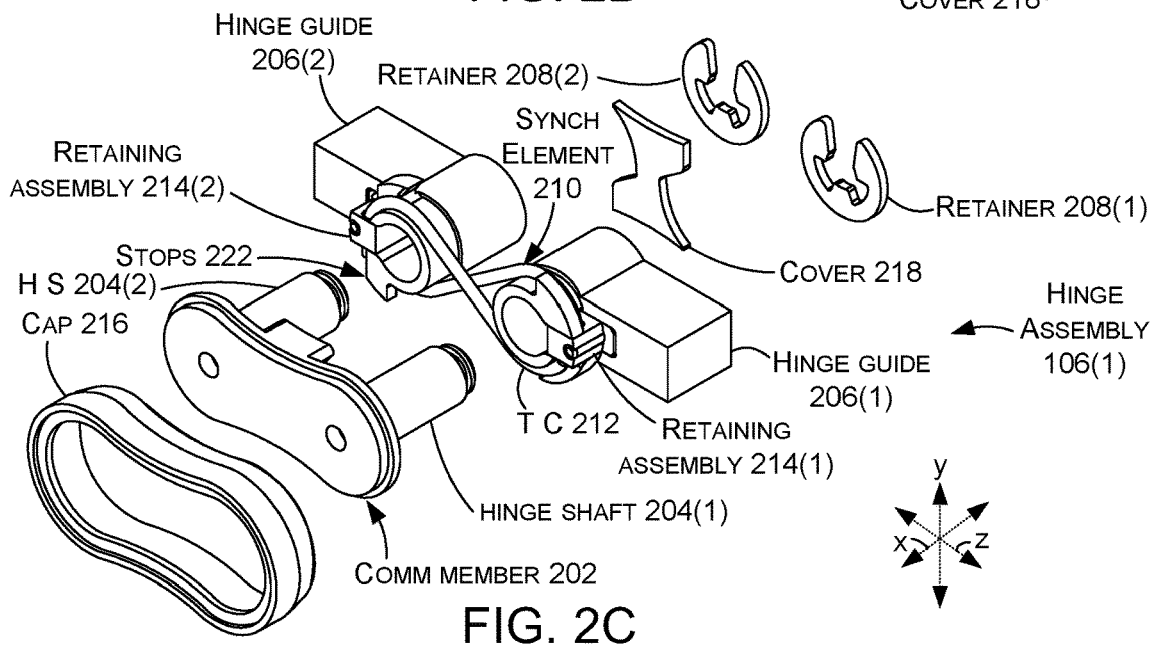

FIG. 2A is a perspective view of example synchronizing hinge assembly 106(1) in the 180-degree orientation. FIG. 2B is a similar exploded perspective view of the synchronizing hinge assembly 106(1). FIG. 2C is an exploded perspective view from the opposite side (e.g., −y reference direction rather than +y reference direction) of the synchronizing hinge assembly 106(1).

FIGS. 2A-2C show the hinge assembly 106(1) can include a communication member 202 that can span between the first and second portions (102 and 104, FIG. 1). The communication member 202 can define first and second hinge shafts 204 at a fixed distance from one another. Hinge guides 206 can be positioned over the hinge shaft 204. The hinge guides 206 can be secured to the first and second portions (102 and 104, FIG. 1). The hinge guides 206 can be secured on the hinge shaft 204 by retainers 208, or other retention elements so that the hinge guides do not slip off of the ends of the hinge shafts.

A synchronizing or timing element 210 can be positioned around the hinge shafts 204 to synchronize rotation of the first and second portions (102 and 104, FIG. 1) around the first and second hinge shafts 116(1) and 116(2), respectively. The synchronizing element 210 can be under tension (e.g., tensioned synchronizing element) and have low elongation properties to maintain the tension. In this case, the synchronizing element 210 is manifest as a tensioned cord 212 that is positioned around the hinge shafts in a figure-eight manner. Retaining assemblies 214 (FIG. 2C) can be used to fix the synchronizing element 210 relative to the hinge shafts 204 (e.g., relative to the hinge guides 206 which rotate around the hinge shafts 204). In this case, the retaining assemblies 214 can be offset (e.g., retaining assembly 214(2) retains the tensioned cord one cord diameter closer to the communication member 202 than retaining assembly 214(1) to create a jog in the tensioned cord that prevents it from rubbing on itself). In this implementation, the tensioned cord 212 is positioned around the hinge shafts 204 in a figure-eight manner. The figure-eight tensioned cord ensures that the tensioned cord remains under tension throughout a range of rotation of the first and second portions. This aspect will be described in more detail below. The tensioned cord can be made from a single strand and/or can be multi-stranded. The tensioned cord can have a rounded cross-sectional profile or a flattened cross-sectional profile, among other profiles.

The synchronizing element 210 can be protected by cap 216 and cover 218. The cap 216 is positioned around the communication member 202 and the cover 218 is positioned on the other side of the communication member 202.

Stops (e.g., rotation limiters) 220 on the communication member 202 and the hinge guides 206 can define a range of rotation for the first and second portions 102 and 104 around hinge axes 116(1) and 116(2), respectively. In this case, there is a first set of stops 222 on the hinge guides 206 and a second set of stops 224 on the communication member 202. Interactions of the two sets of stops 222 and 224 can define a range of rotation of the first and second portions around the hinge axes. This aspect is discussed in more detail below relative to FIGS. 3D, 3E, 5D, and 5E where individual stops are designated with specificity.

Figure 3A:
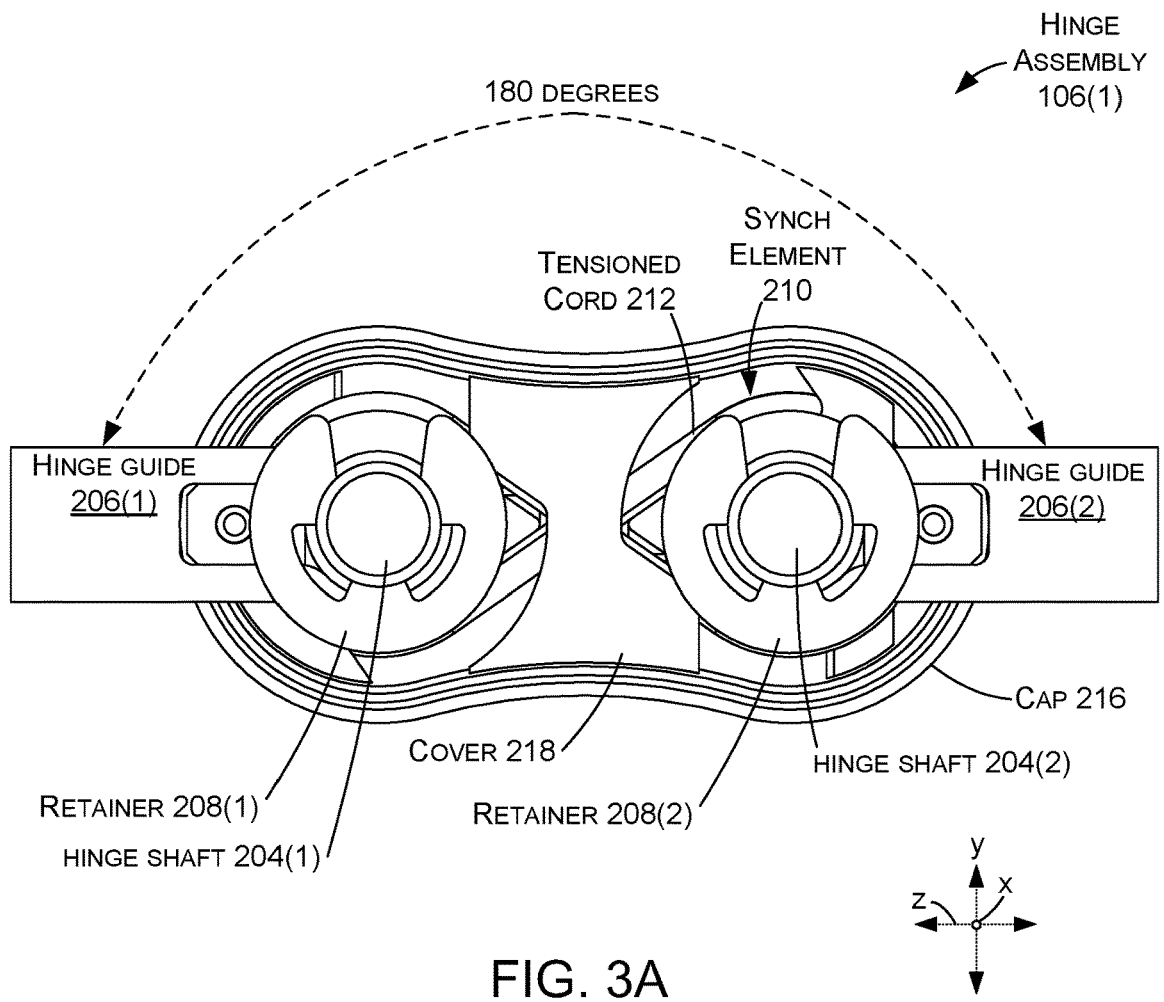
FIGS. 3A-3E and 5A-5E show elevational views of example devices in accordance with some implementations of the present concepts.
Figure 3B:
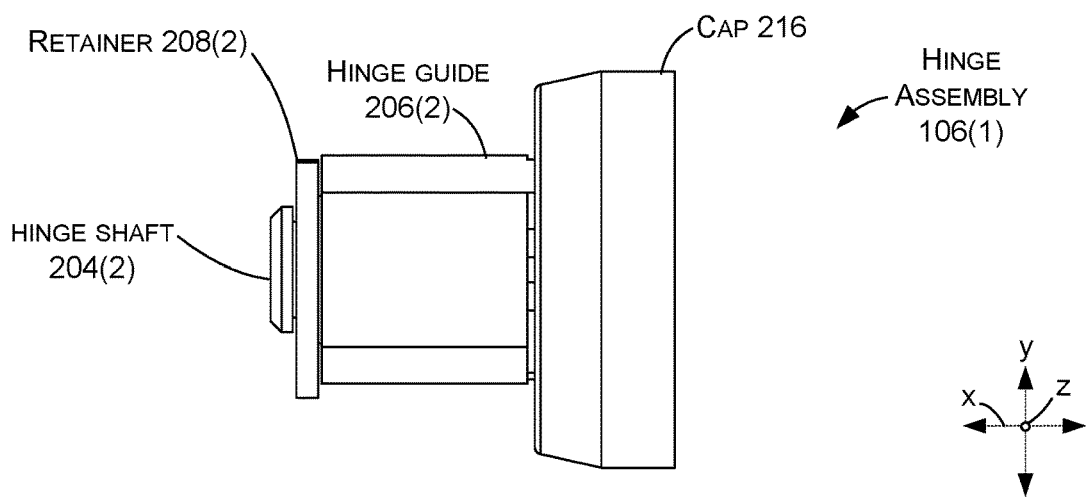
Figure 3C:
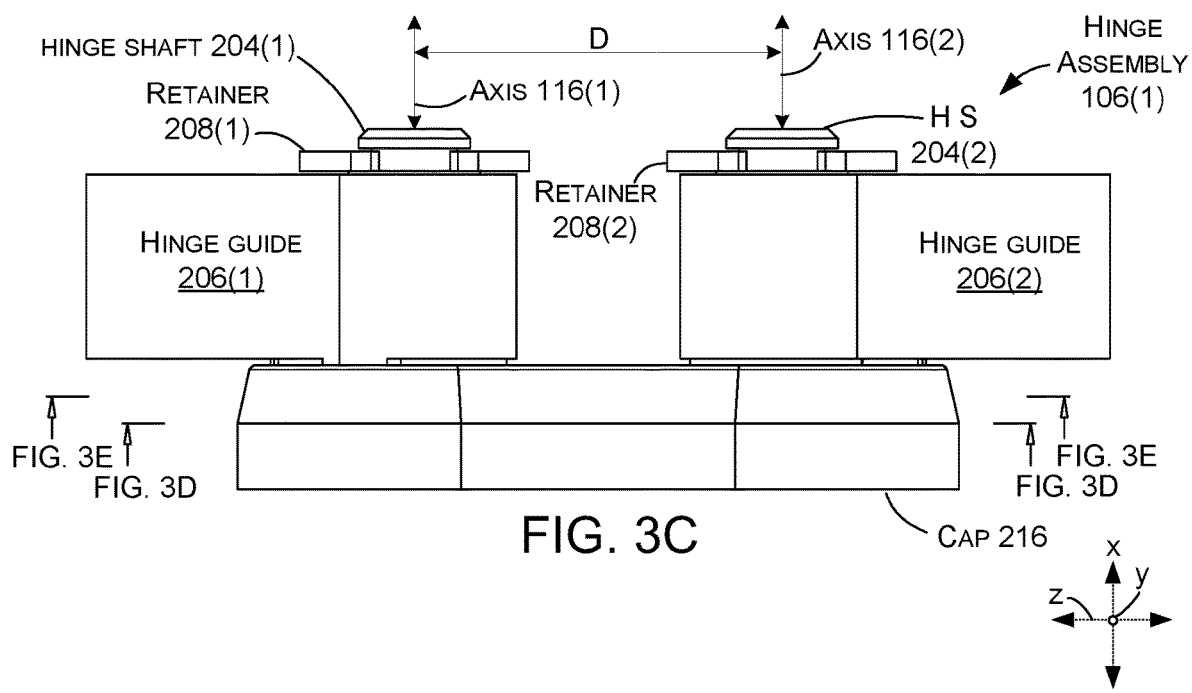

FIGS. 3A-3C are elevational views of the hinge assembly 106(1). FIG. 3A is a top elevational view looking down the hinge axes 116 (e.g., along the x reference axis). FIG. 3B is a side elevational view along the z-reference axis and FIG. 3C is a side elevational view along the y-reference axis. FIG. 3C shows that the hinge shafts 204 are spaced apart by a fixed distance D between the hinge axes 116 (e.g., distance D does not change between the 180-degree orientation of FIG. 3C and the zero-degree orientation of FIG. 5C).

Figure 3D:
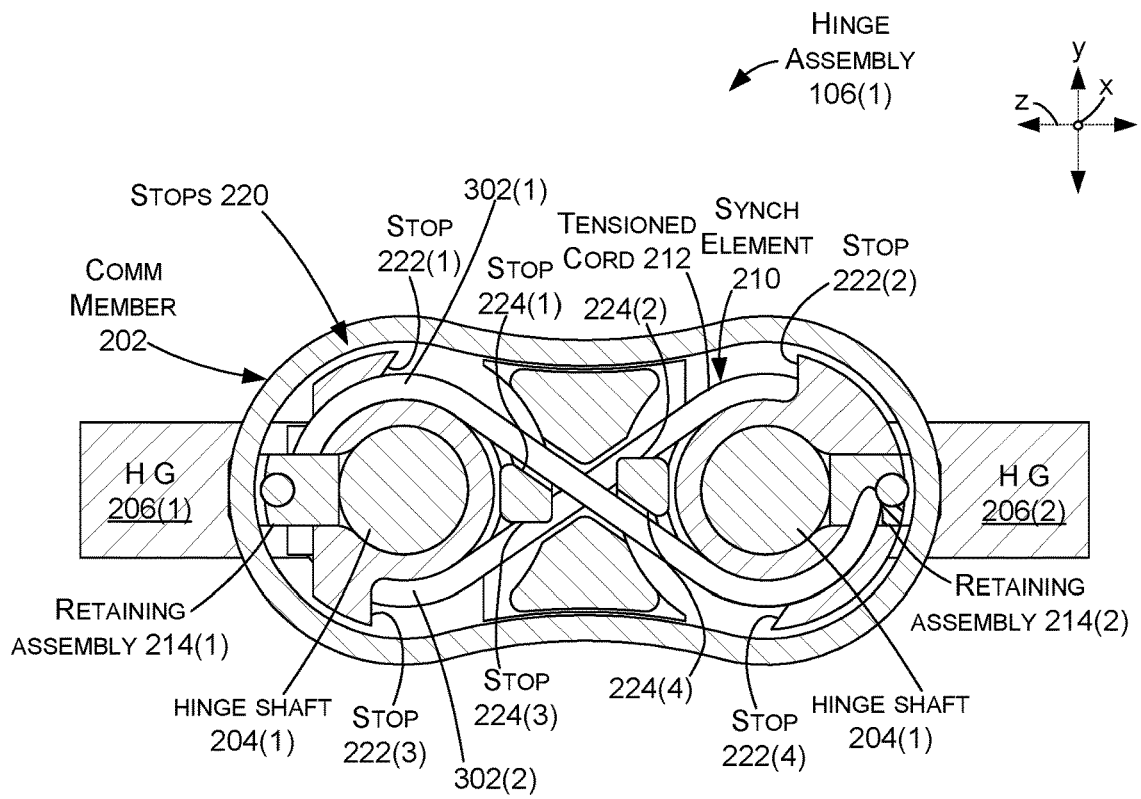
Figure 3E:
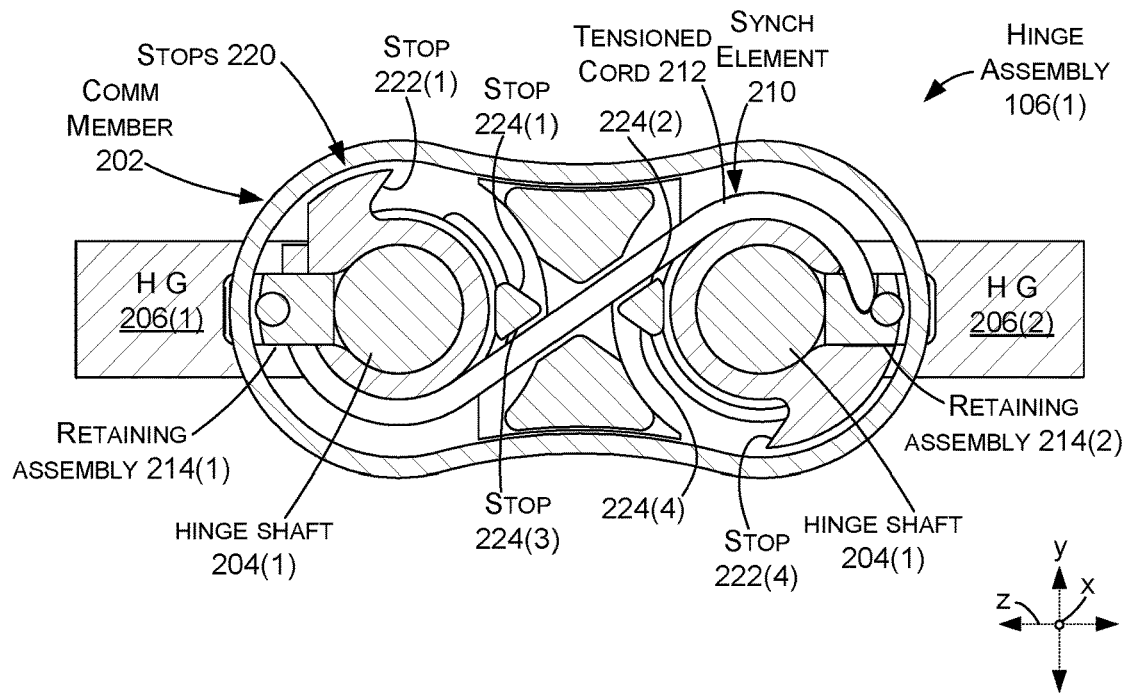
Figure 4A:
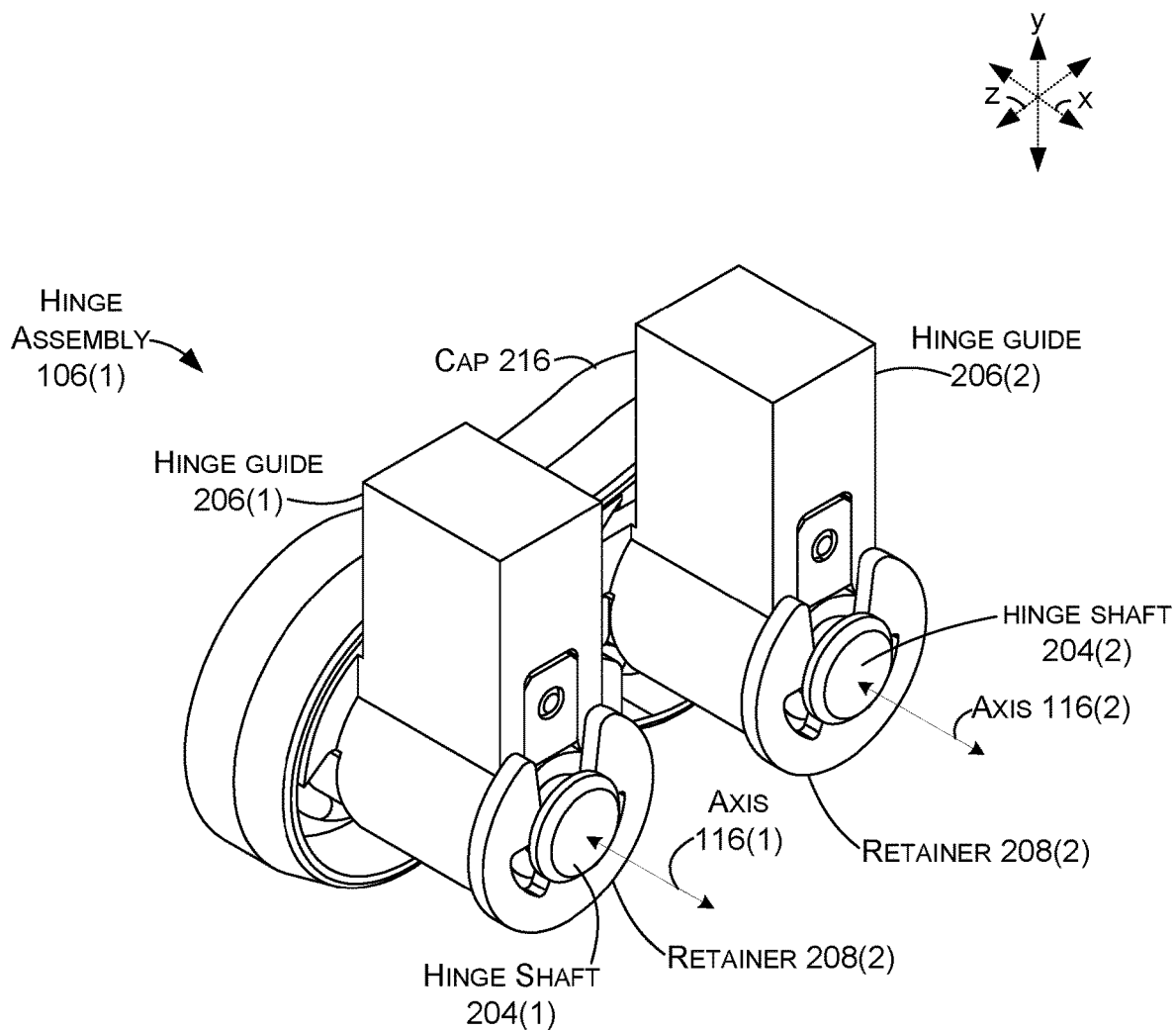
Figure 4B:
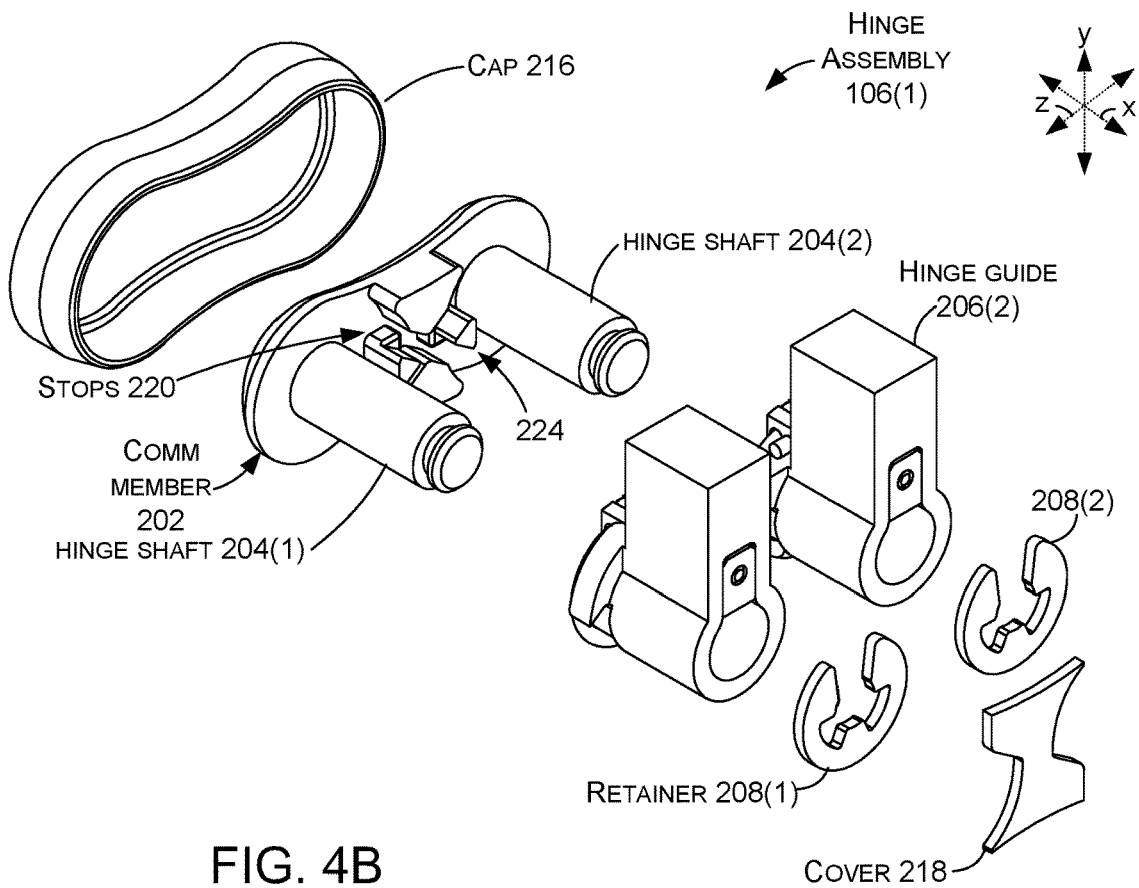
Figure 4C:
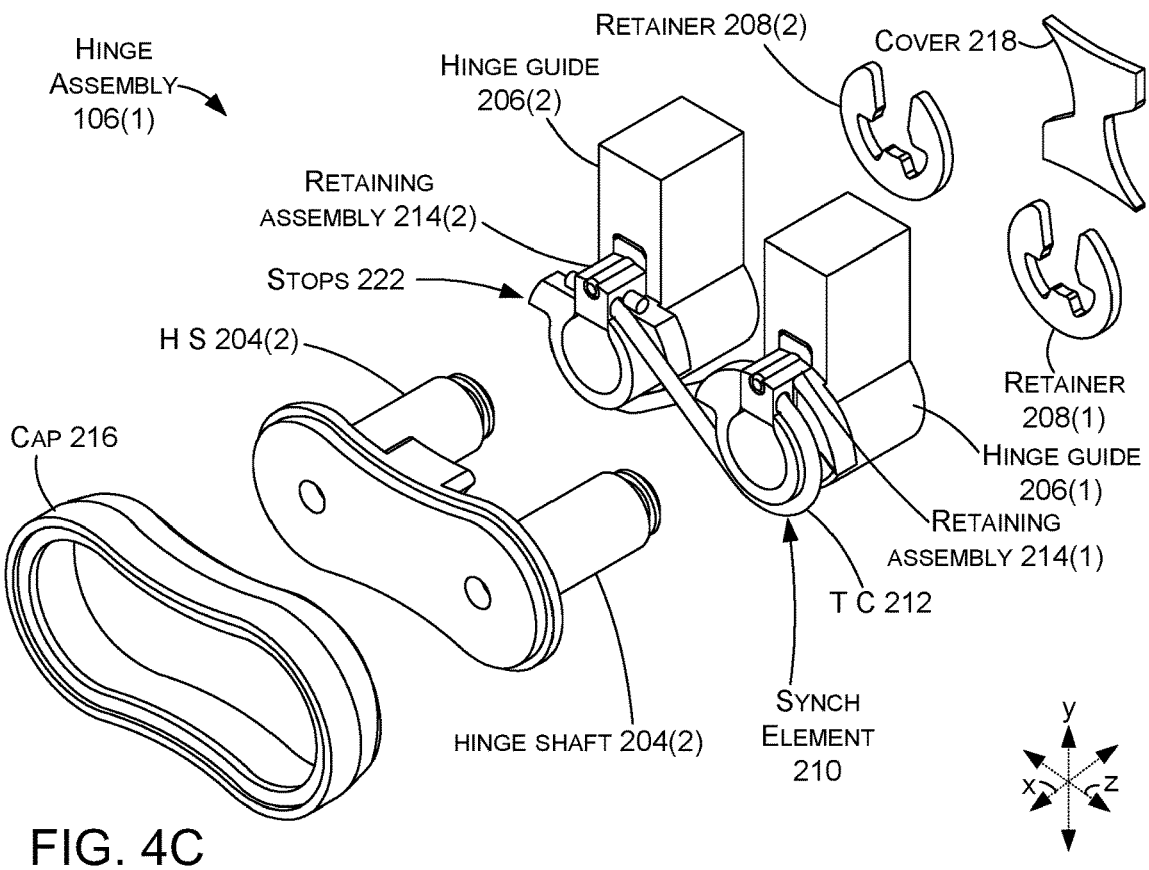
Figure 5A:
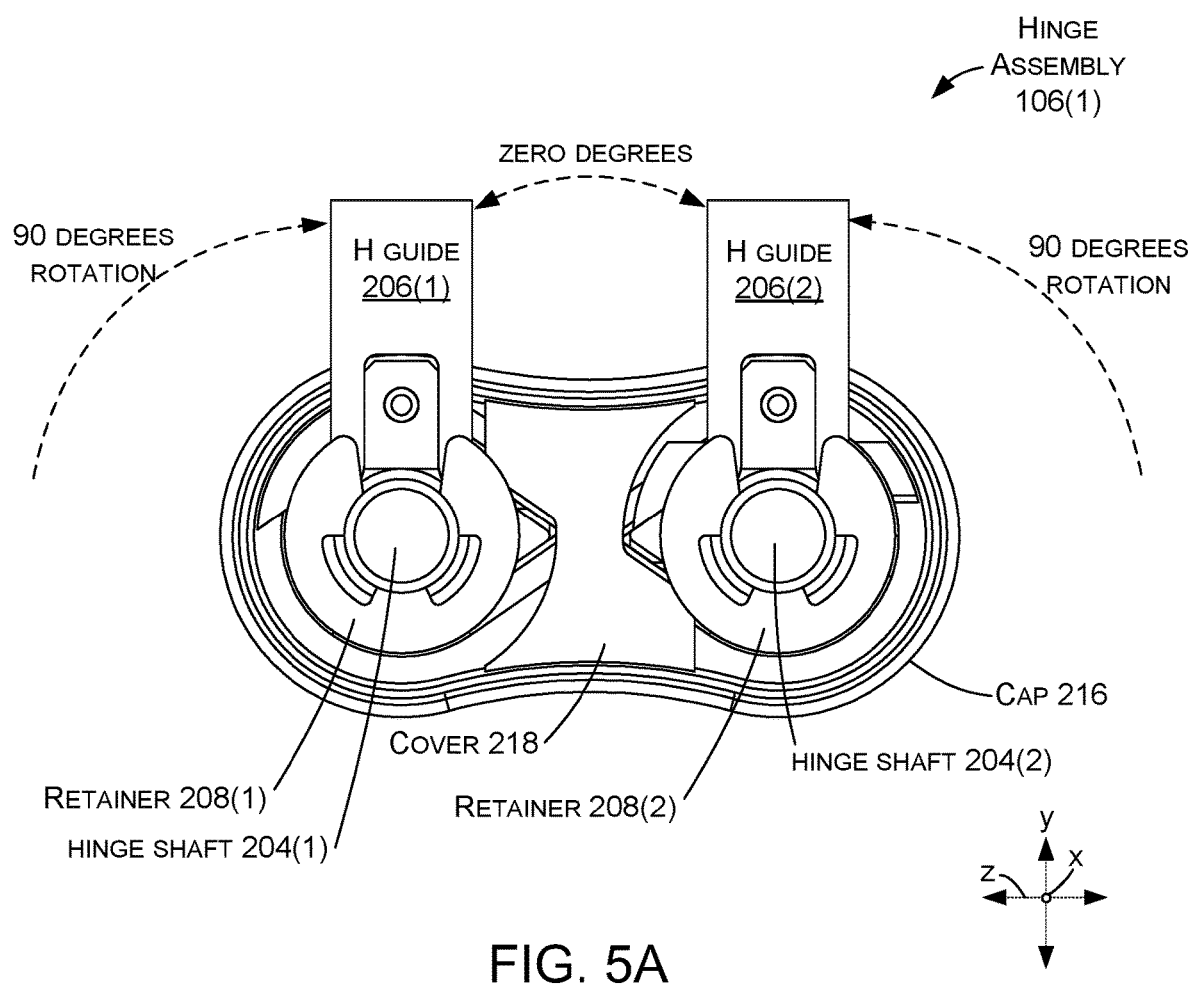
Figure 5B:
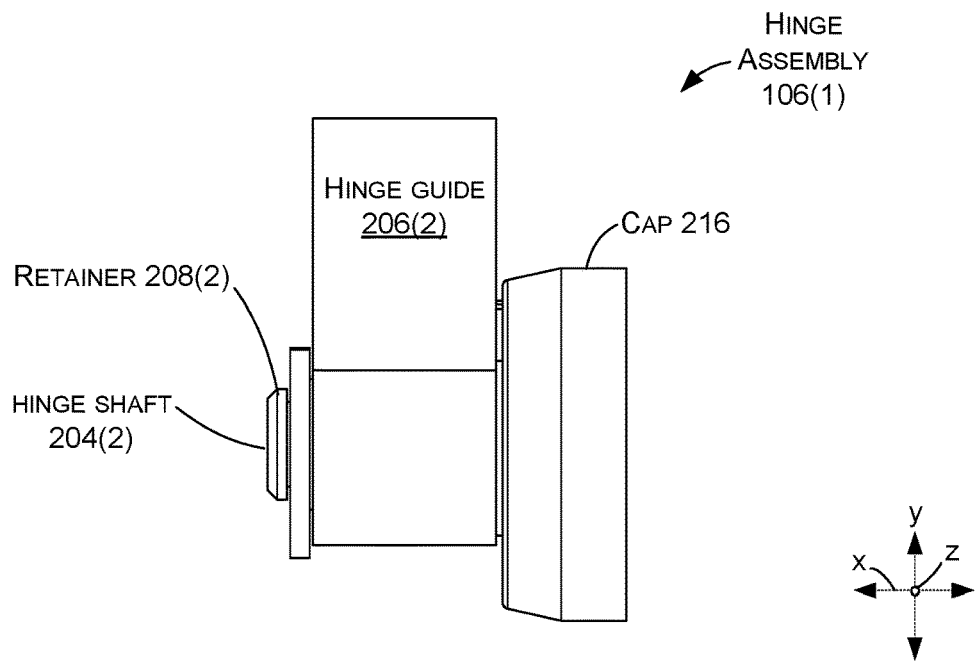
Figure 5C:
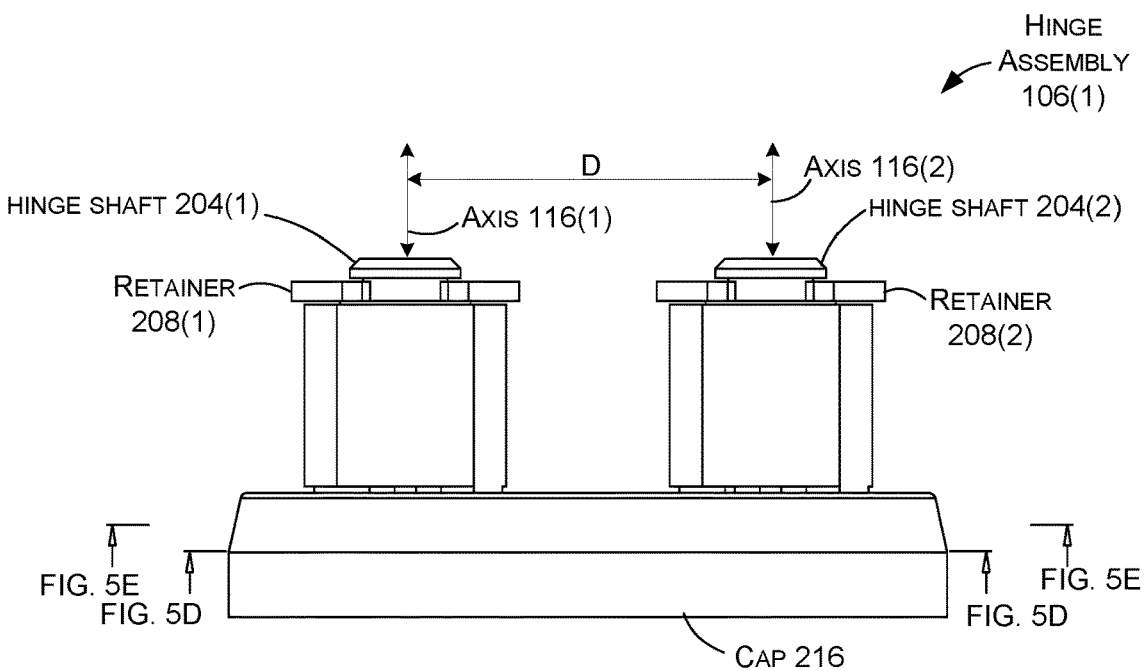
Figure 5D:
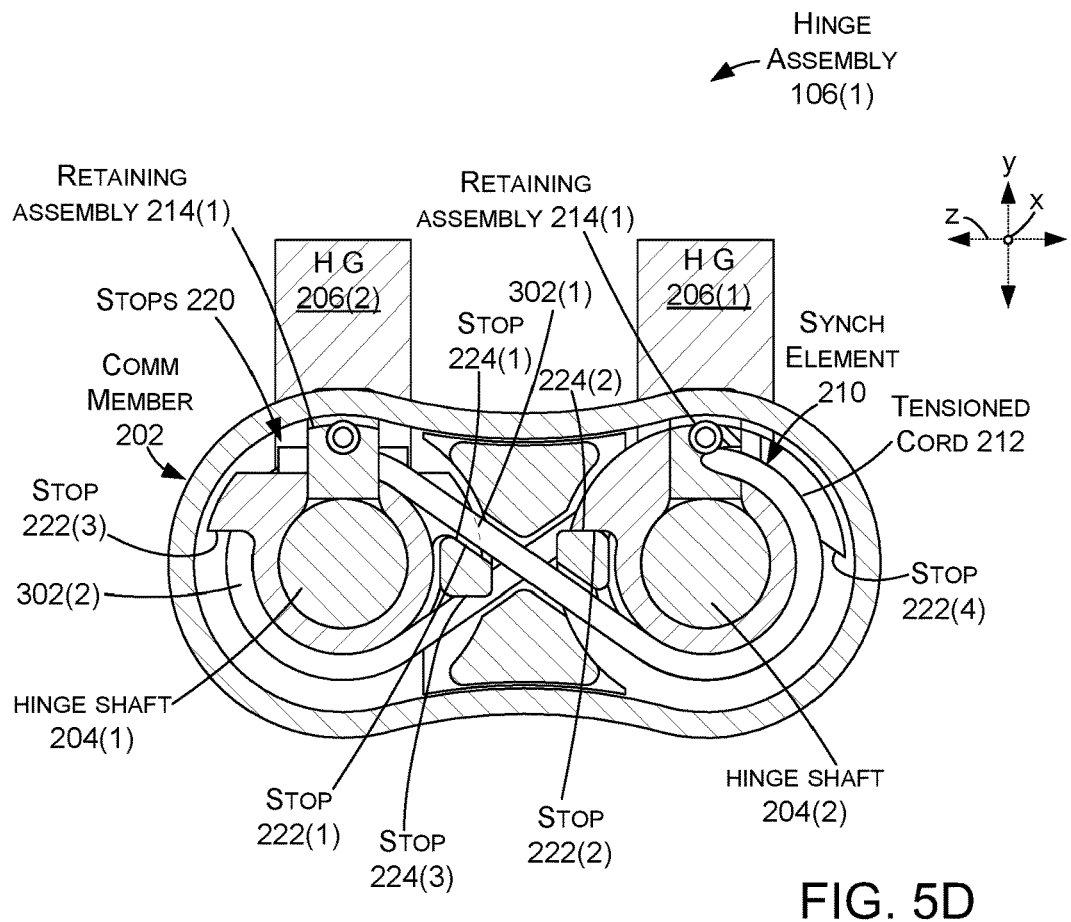
Figure 5E:
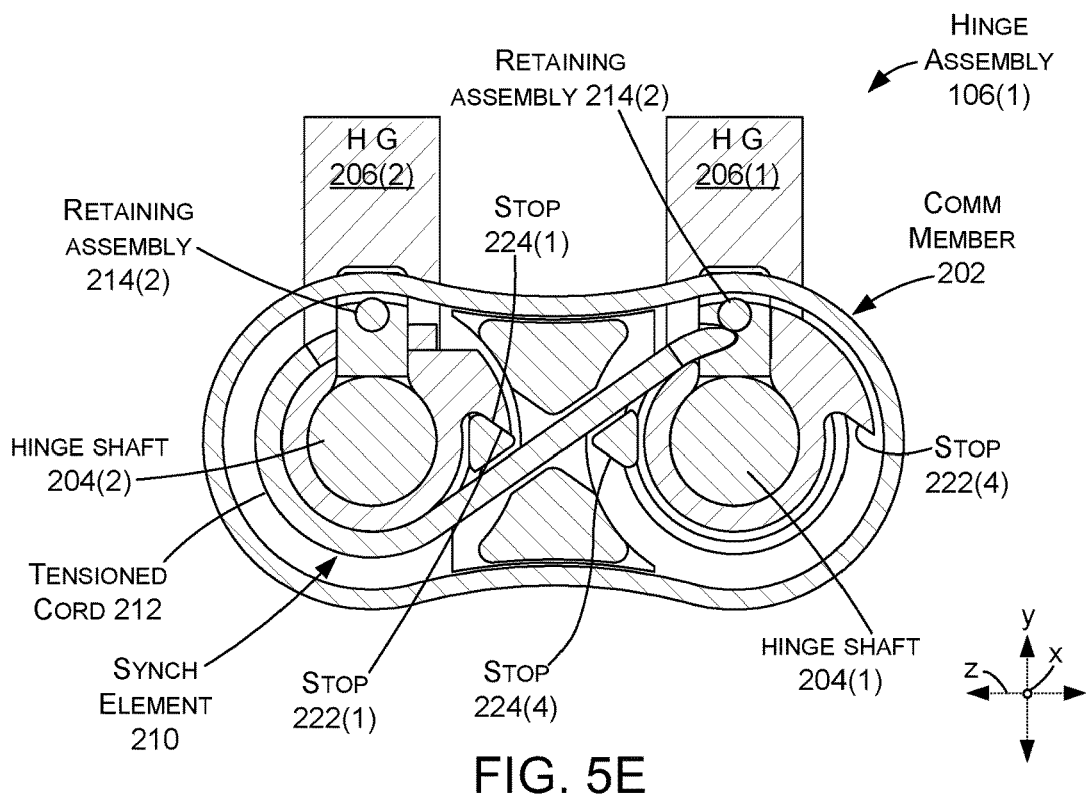

FIGS. 3D and 3E show similar orientations as FIG. 3A, but are partial cutaway views of the hinge assembly as indicated in FIG. 3C. These partial cutaway views expose the synchronization element 210 and the stops 220. Two views are shown because the tensioned cord has a jog or offset around the hinge guides so it (the tensioned cord) does not rub on itself.

FIG. 3D shows the first set of stops includes four stops 222(1)-222(4) of the hinge guides 206. Specifically, stops 222(1) and 222(3) are defined by hinge guide 206(1) and stops 222(2) and 222(4) are defined by hinge guide 206(2). The second set of stops also includes four stops 224(1)-224(4) which are defined by the communication member 202. In the illustrated 180-degree orientation, the first and second portions (represented by hinge guides 206) are at the midpoint of their range of rotation. As such, none of the stops are engaging one another.

In this implementation, the synchronizing element 210 is manifest as a length of cord. As shown in FIG. 3E, a first end of the cord can be secured to the second hinge guide 206(2). The cord can then be wrapped counter-clockwise over the top of hinge shaft 204(1). The cord can be fed between the stops 224 of the communication member 202 and clockwise around hinge guide 206(1). As shown in FIG. 3D, the cord can be fed back around the underside of hinge guide 206(2) and placed under tension while being secured by retaining assembly 214(2) to create tensioned cord 212. Retaining assembly 214(1) can then be used to secure a portion of the tensioned cord to hinge guide 206(1). At this point (e.g., midway through the range of rotation) tension is generally uniform along the entire length of the tensioned cord. For instance, portions 302(1) and 302(2) are generally under similar tension at this orientation.

At this point, the first and second portions (represented by hinge guides 206) can rotate either up or down. The tensioned cord 212 ensures that equivalent rotation will occur around each hinge axis 116. FIGS. 4A-5E show a scenario where the first and second portions are rotated upward.

FIGS. 4A-5E show the hinge assembly 106(1) rotated 180 degrees relative to the 180-degree orientation of FIGS. 2A-3E to a zero-degree orientation (e.g., 90 degrees of clockwise rotation of hinge guide 206(1) around hinge shaft 204(1) and 90 degrees of simultaneous counter-clockwise rotation of hinge guide 206(2) around hinge shaft 204(2)).

Figure 6:
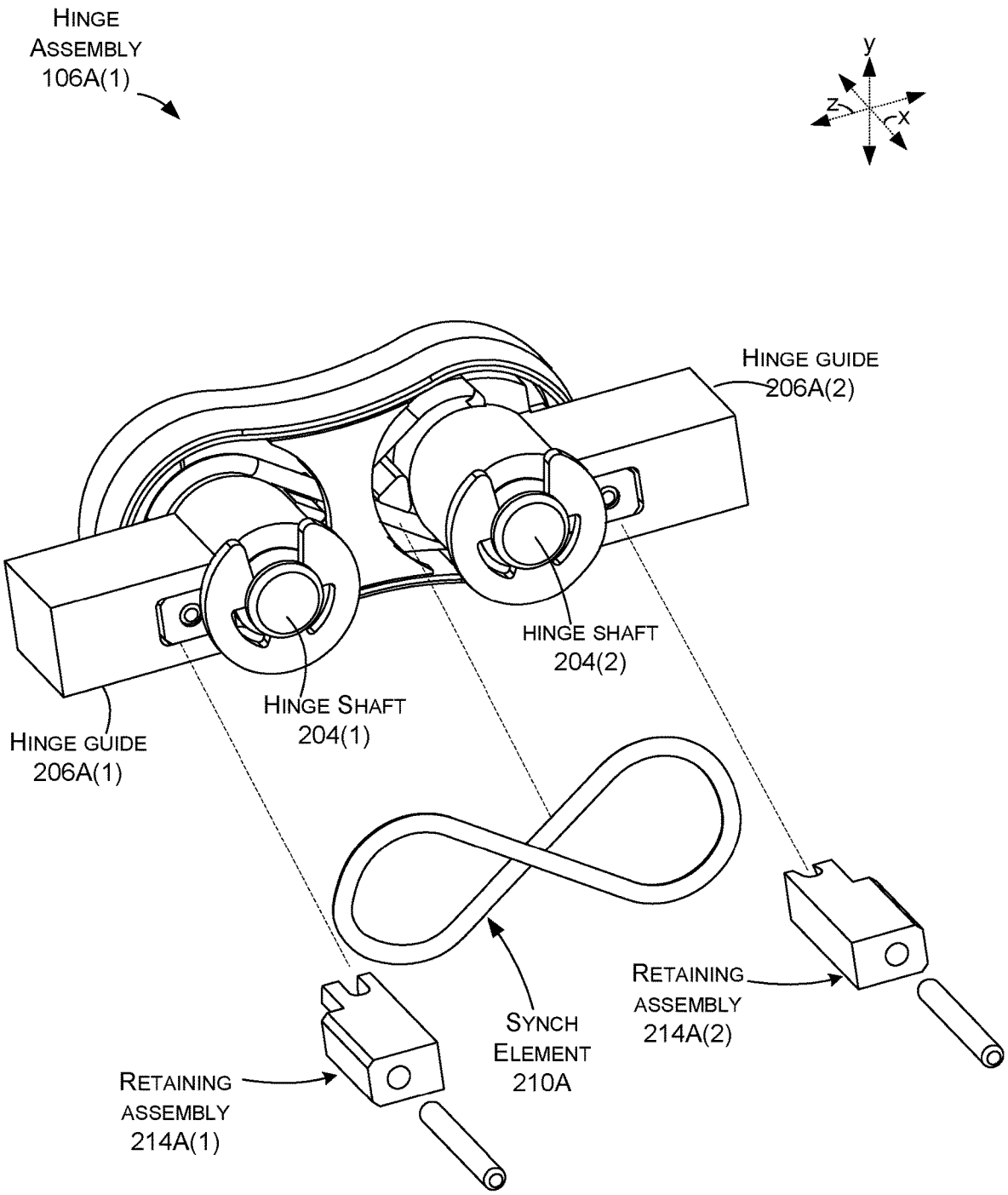
Figure 7:
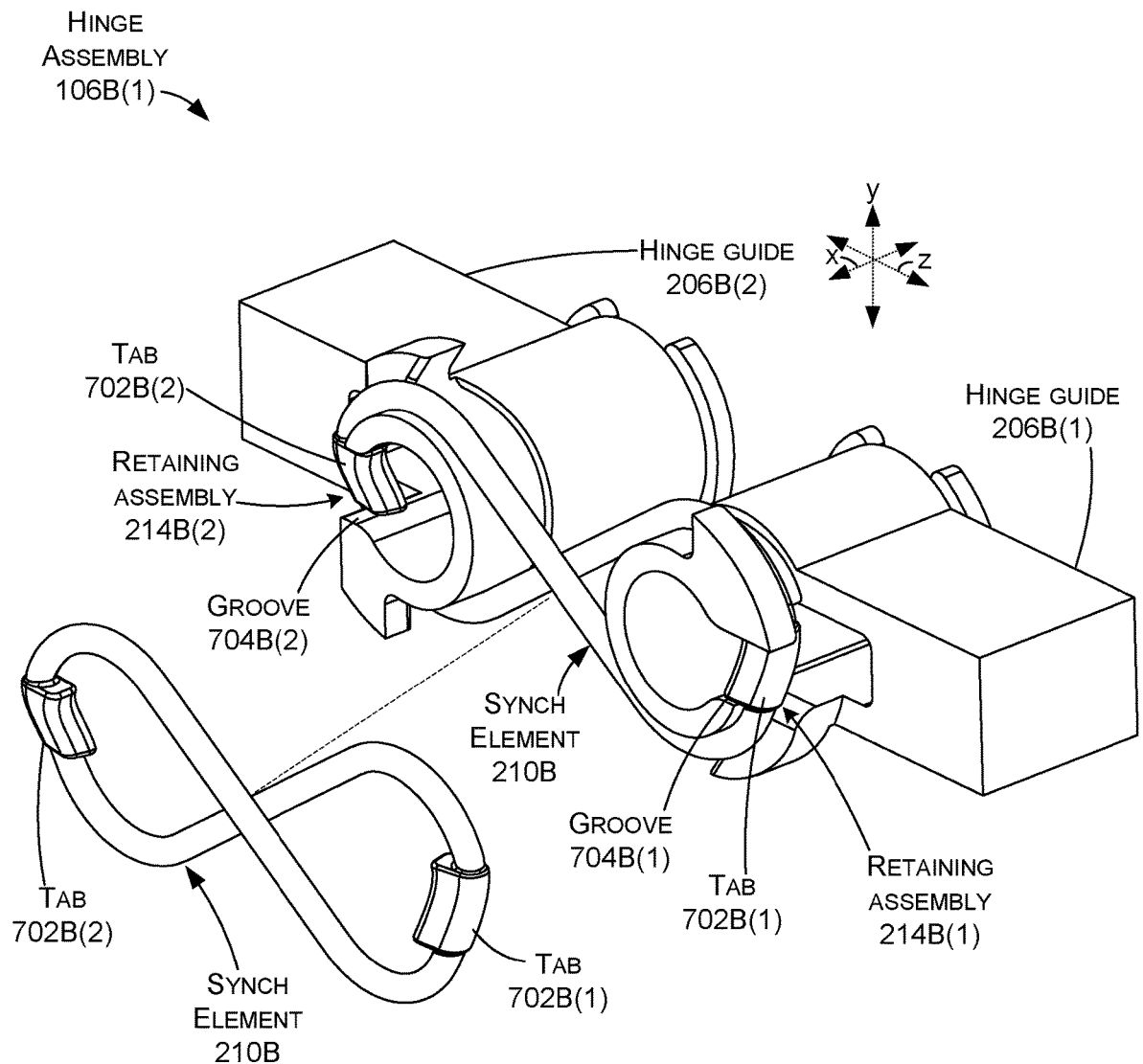

FIGS. 6 and 7 show additional hinge assemblies 106A(1) and 106B(1), respectively at the 180-degree orientation similar to FIG. 2A. In these implementations, the synchronizing element 210 can be a continuous element (e.g., a loop with no ends). In each case, the synchronizing element is shown both installed and in isolation.

In FIG. 6, synchronizing element 210A is secured relative to the hinge guides 206A by retaining assemblies 214A(1) and 214A(2), that are similar to those described above relative to FIGS. 2A-5E. These retaining assemblies can pinch the synchronizing element 210A to prevent relative rotation. (For clarification purposes this FIG. shows the retaining assemblies and the synchronizing element both installed and in isolation).

FIG. 7 shows an alternative implementation as hinge assembly 106B(1). In this case, the retaining assemblies 214B include tabs 702B on the synchronizing element 210B and grooves (e.g., recesses) 704B on the hinge guides 206B. (For clarification purposes this FIG. shows the synchronizing element 210B both installed and in isolation). The tabs 702B can engage the grooves 704B to prevent relative rotation between the synchronizing elements and the hinge guides.

For implementations such as those represented by FIGS. 6 and 7 that employ a continuous synchronizing element 210, a slightly undersized synchronizing element 210 can be formed into a figure-eight shape. The synchronizing element 210 can be forced (e.g., tensioned or stretched) over the hinge guides 206 to create the tensioned cord 212.

Figure 8A:
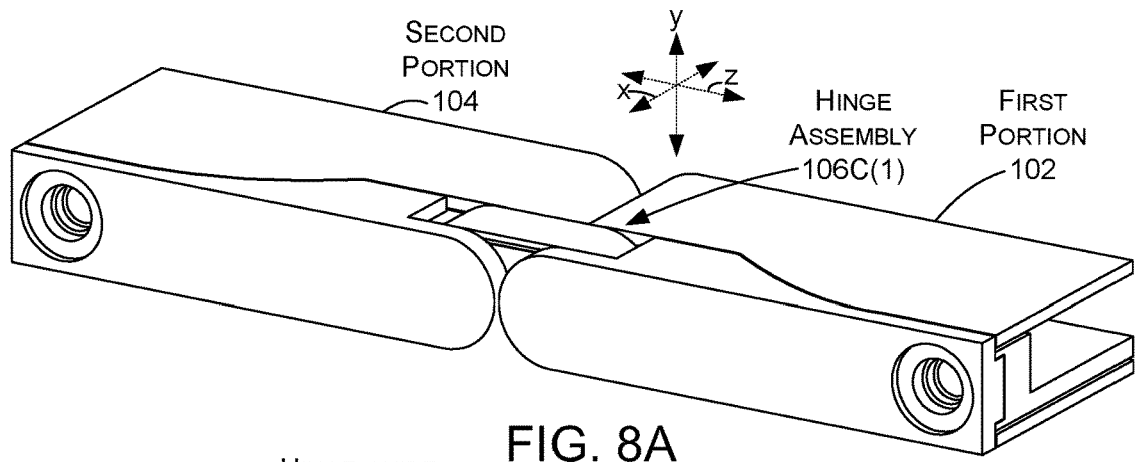
Figure 8B:
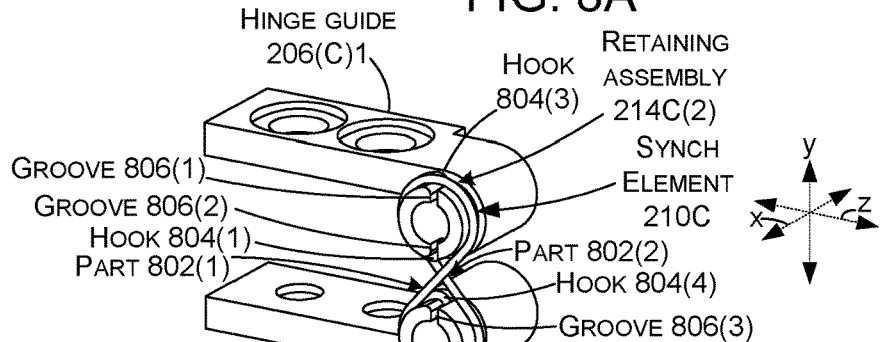
Figure 8C:
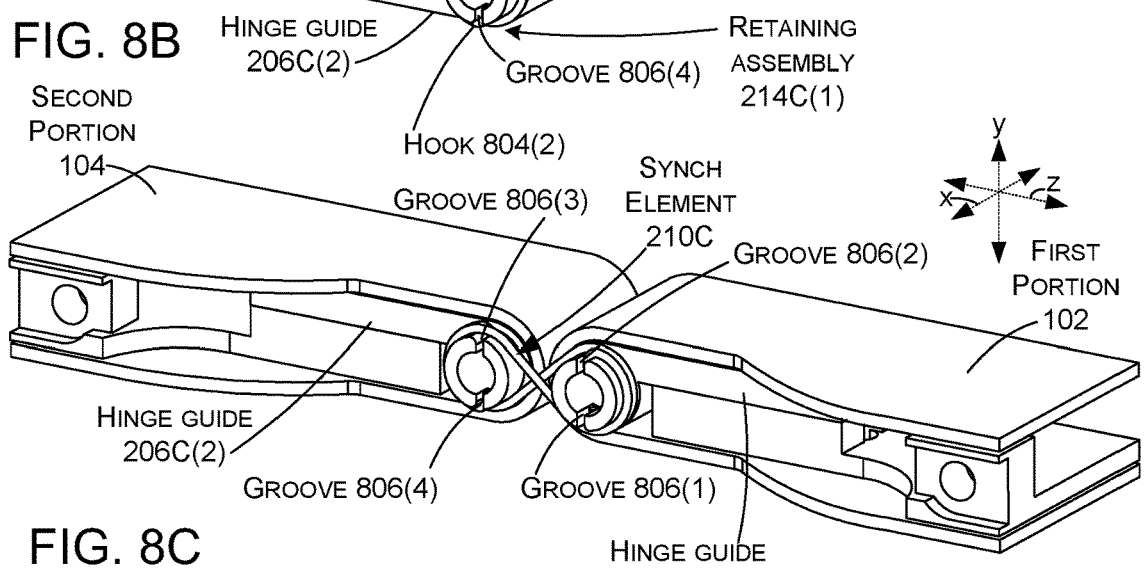
Figure 8D:
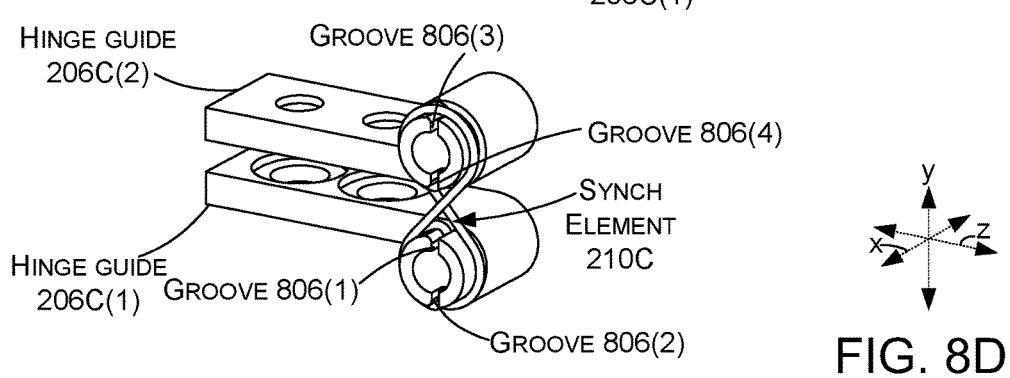

FIGS. 8A-8D collectively show an alternative implementation as hinge assembly 106C(1). FIG. 8A shows the hinge assembly and the first and second portions at a 180-degree orientation. FIG. 8B shows the hinge assembly in isolation at a zero-degree orientation. FIG. 8C shows a partial cutaway view of the hinge assembly at the 180-degree orientation. FIG. 8D shows the hinge assembly in isolation at a 360-degree orientation.

This hinge assembly 106C(1) implementation can employ a multipart synchronizing element 210C. In this case, the two parts of the synchronizing element are designated 802(1) and 802(2). Part 802(1) is positioned toward the reader and part 802(2) is positioned away from the reader. The parts 802 can be made from spring steel or similar material and have hooks 804 at each end (hooks 804(1) and 804(2) on part 802(1) and hooks 804(3) and 804(4) on part 802(2)). The hooks 804 are positioned in grooves 806 (similar to grooves 704 of FIG. 7) on the hinge guides 206C to function as retaining assemblies 214C. In this example, each hinge guide has opposing grooves 806, with grooves 806(1) and 806(2) on hinge guide 206C(1) and grooves 806(3) and 806(4) on hinge guide 206C(2).

Part 802(1) is connected to hinge guide 206C(1) by hook 804(1) in groove 806(2) and wraps half way around the hinge guide 206C(1) over to the opposite hinge guide 206C(2) and wraps in the opposite direction, attaching to hinge guide 206C(2) via hook 804(2) in groove 806(4). Part 802(2) is connected to hinge guide 206C(1) by hook 804(3) in groove 806(1) and wraps in the opposite direction to part 802(1) half way around the hinge guide 206C(1) over to the opposite hinge guide 206(C2) and wraps in the opposite direction, attaching to hinge guide 206C(2) via hook 804(4) in groove 806(3) wrapping in the opposite direction from part 802(1) to create what looks like a figure-eight synchronizing element 210C. When one side is rotated, it winds up the spring wire and the opposite side is unwound in an even exchange forcing the two device portions to move synchronously. The two spring wires are under tension which eliminates any backlash and creates a smooth transition when the direction is changed.

Synchronizing element 210C can create a stronger link between the device's first and second portions 102 and 104 that cannot be achieved with gears at a small scale (e.g., relatively small hinge shaft diameter). The synchronizing element can create a smooth high-quality feel that cannot be achieved with gears. The synchronizing element can also provide a pathway for electrical cables to communicate between device portions. Such an implementation is described below relative to FIGS. 9A-9C.

Figure 9A:
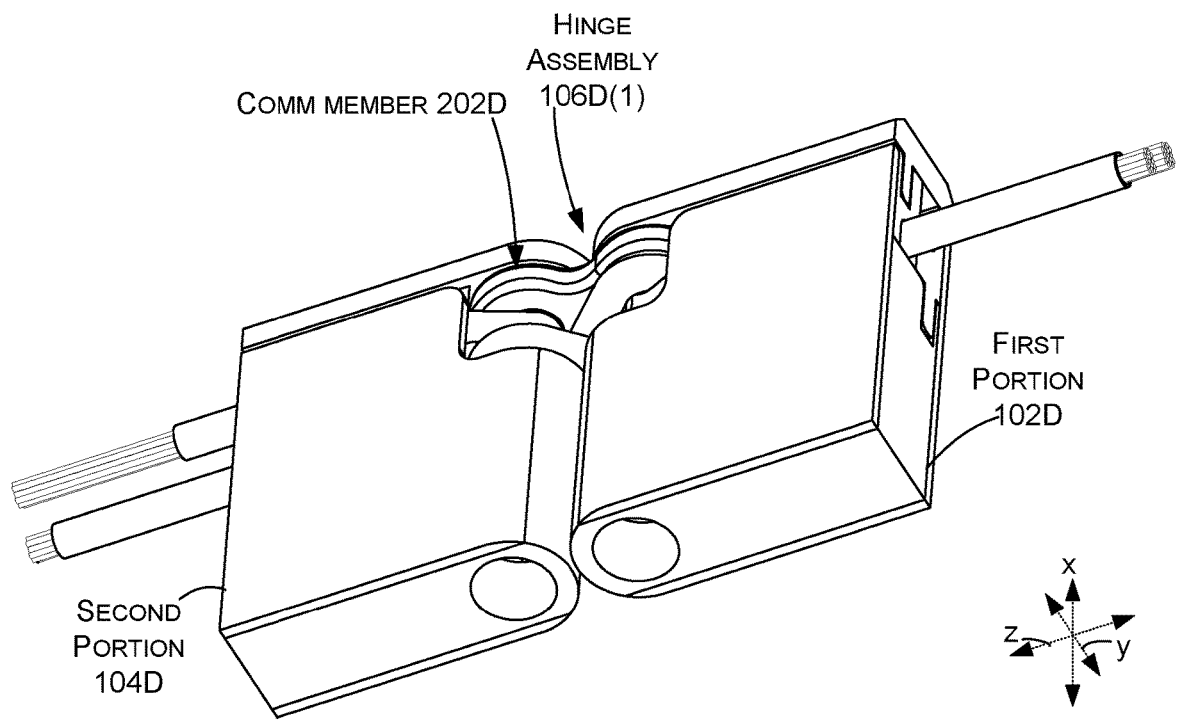
Figure 9B:
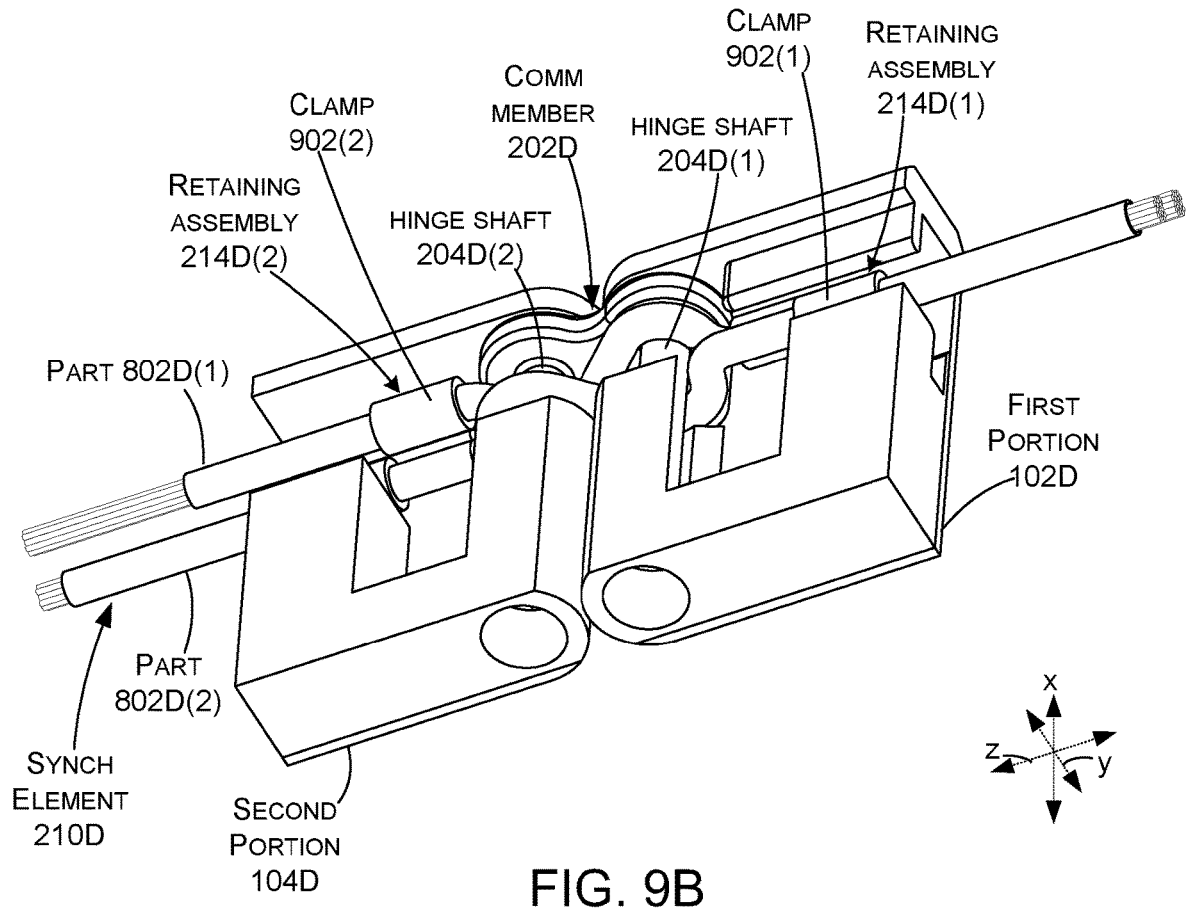
Figure 9C:
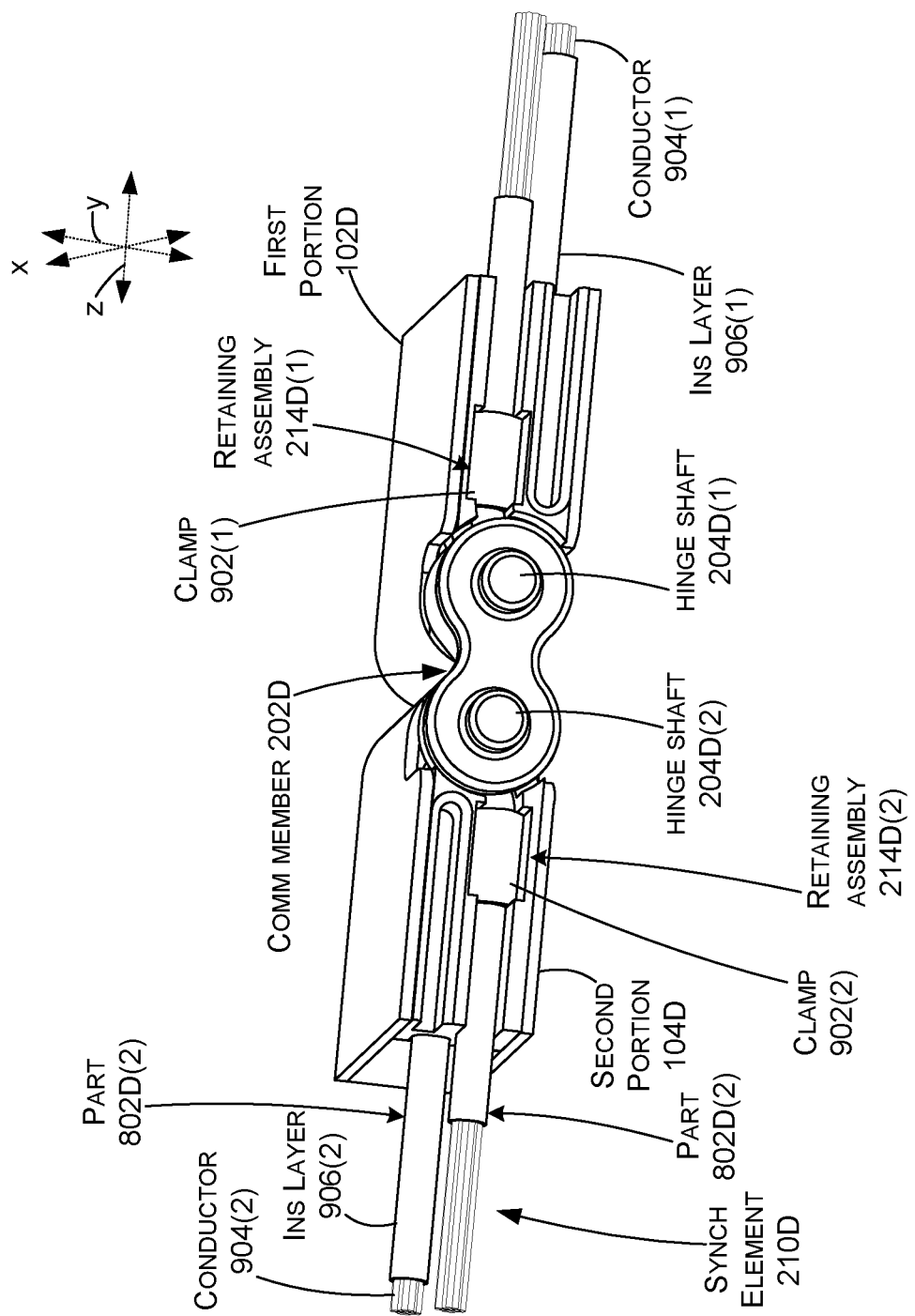

FIGS. 9A-9C collectively show another hinge assembly 106D(1). FIG. 9A is a perspective view and FIG. 9B is a similar slightly exploded perspective view. FIG. 9C is a perspective view of the underside of the hinge assembly (e.g., taken along the hinge axes or the x reference axis). In this implementation, like hinge assembly 106C(1) of FIGS. 8A-8D, the synchronizing element 210D includes two parts 802D(1) and 802D(2). In this case, the parts are wrapped directly around the hinge shafts 204D in a mirror image fashion to one another. The retaining assemblies 214D are manifest as clamps 902 that secure the parts 802 to the first and second portions 102D and 104D.

In this implementation the synchronizing element 210D can perform both a structural role and an electronic role. Toward that end the parts include an electrical conductor (e.g., electrically insulative member) 904 surrounded by an electrically insulative layer (e.g., sheath) 906. The conductor 904 can electrically connect electronic components of the first and second portions 102D and 104D and/or serve as a system ground for the device.

Various synchronizing element implementations are described above. The synchronizing element can be manifest as a tensioned cord(s), such as a wire, belt, cable, or rope. The synchronizing element can be made from various materials, such as various metals and/or synthetic materials. The synchronizing element can be selected from a material and constructed in a manner to have low elongation to effectively deal with torque differentials between hinge guides 206 so that both sides of the synchronizing element remain at relatively equal lengths and tensions. In the examples of FIGS. 6 and 7, the tensioned cord can be continuous loop, such as a belt. Multiple strands of wire/cable can also carry electrical signals/energy, such as in FIGS. 9A-9C. The synchronizing element can also be manifest as a cosmetic ribbon(s) that is exposed external of the device and act in the same manner for a more simplistic or minimalistic look.

The present hinge assembly concepts can be utilized with any type of device, such as but not limited to notebook computers, smart phones, wearable smart devices, tablets, and/or other types of existing, developing, and/or yet to be developed devices.

Various methods of manufacture, assembly, and/or use for hinge assemblies and devices are contemplated beyond those shown above relative to FIGS. 1-9C.

Although techniques, methods, devices, systems, etc., pertaining to hinge assemblies are described in language specific to structural features and/or methodological acts, it is to be understood that the subject matter defined in the appended claims is not limited to the specific features or acts described. Rather, the specific features and acts are disclosed as example forms of implementing the claimed methods, devices, systems, etc.

Various device examples are described above. Additional examples are described below. One example includes a device comprising a first portion associated with a first display and a second portion associated with a second display, the first portion rotatably secured to a first hinge shaft and the second portion rotatably secured to a second hinge shaft that is a fixed distance from the first hinge shaft and a tensioned synchronizing element positioned around the first and second hinge shafts and that synchronizes rotation around the first and second hinge shafts.

Another example can include any of the above and/or below examples where the first portion is rotatably secured to the first hinge shaft via a first hinge guide positioned around the first hinge shaft and the second portion is secured to the second hinge shaft via a second hinge guide positioned around the second hinge shaft. The tensioned synchronizing element is positioned around and contacts the first and second hinge guides.

Another example can include any of the above and/or below examples where the tensioned synchronizing element is under tension during an entire range of rotation of the first and second portions.

Another example can include any of the above and/or below examples where the synchronizing element has low elongation properties.

Another example can include any of the above and/or below examples where the device further comprising a communication member that extends between the first portion and the second portion, wherein the first hinge shaft and the second hinge shaft are secured to the communication member spaced apart by the fixed distance.

Another example can include any of the above and/or below examples where the communication member comprises first rotation limiters and second rotation limiters.

Another example can include any of the above and/or below examples where the first and second portions comprise third rotation limiters positioned between the first and second rotation limiters and rotation of the third rotation limiters between the first and second rotation limiters defines the range of rotation for the first and second portions.

Another example can include any of the above and/or below examples where the tensioned synchronizing element comprises a cord.

Another example can include any of the above and/or below examples where the cord comprises a single strand cord or a multi-strand cord.

Another example can include any of the above and/or below examples where the cord has a circular cross-sectional profile or a flattened cross-sectional profile.

Another example can include any of the above and/or below examples where the cord comprises a synthetic material or a metallic material.

Another example can include any of the above and/or below examples where the cord comprises a structural member that is surrounded by a sheath.

Another example can include any of the above and/or below examples where the cord comprises an electrically conductive member that is grounded to the first and second portions.

Another example can include any of the above and/or below examples where the cord comprises an electrically conductive member that is configured to carry electrical signals from the first portion to the second portion.

Another example can include any of the above and/or below examples where the cord comprises a belt, a wire, a cable, or a rope.

Another example can include any of the above and/or below examples where the tensioned synchronizing element is positioned around the first and second hinge shafts in a figure-eight manner.

Another example can include any of the above and/or below examples where the tensioned synchronizing element is secured to the first portion and the second portion.

Another example can include any of the above and/or below examples where the tensioned synchronizing element defines first and second tabs. The first portion defines a first groove and the second portion defines a second groove and wherein the first tab is positioned in the first groove to secure the tensioned synchronizing element to the first portion and the second tab is positioned in the second groove to secure the tensioned synchronizing element to the second portion.

Another example includes a device comprising first and second portions, a hinge assembly comprising spaced-apart parallel first and second hinge shafts, the first portion rotatably secured relative to the first hinge shaft and the second portion rotatably secured relative to the second hinge shaft, and a tensioned synchronizing element that synchronizes rotation of the first portion around the first hinge shaft to rotation of the second portion around the second hinge shaft.

Another example includes a device comprising first and second device portions that rotate around first and second hinge shafts and a cord extending in a figure-eight around the first and second hinge shafts and that synchronizes rotation of the first portion around the first hinge shaft to rotation of the second portion around the second hinge shaft.

The invention claimed is:

1. A device, comprising:
    a communication member defining first and second hinge shafts at a fixed distance from one another, the communication member further defining first rotation limiters and second rotation limiters;
    a first portion associated with a first display and a second portion associated with a second display, the first portion rotatably secured to the first hinge shaft and the second portion rotatably secured to the second hinge shaft; and,
    a tensioned synchronizing element positioned around the first and second hinge shafts and that synchronizes rotation around the first and second hinge shafts through a range of rotation that is defined at least in part by the first rotation limiters and the second rotation limiters.

2. The device of claim 1, wherein the first portion is rotatably secured to the first hinge shaft via a first hinge guide positioned around the first hinge shaft and the second portion is secured to the second hinge shaft via a second hinge guide positioned around the second hinge shaft, and wherein the tensioned synchronizing element is positioned around and contacts the first and second hinge guides.

3. The device of claim 1, wherein the tensioned synchronizing element is under tension during an entire range of rotation of the first and second portions.

4. The device of claim 3, wherein the tensioned synchronizing element has low elongation properties.

5. The device of claim 1, wherein the tensioned synchronizing element comprises multiple tensioned synchronizing elements.

6. The device of claim 1, wherein the tensioned synchronizing element comprises a single loop of cord.

7. The device of claim 1, wherein the first and second portions comprise third rotation limiters positioned between the first and second rotation limiters and rotation of the third rotation limiters between the first and second rotation limiters defines the range of rotation for the first and second portions.

8. The device of claim 1, wherein the tensioned synchronizing element comprises a cord.

9. The device of claim 8, wherein the cord comprises a single strand cord or a multi-strand cord.

10. The device of claim 8, wherein the cord has a circular cross-sectional profile or a flattened cross-sectional profile.

11. The device of claim 8, wherein the cord comprises a synthetic material or a metallic material.

12. The device of claim 8, wherein the cord comprises a belt, a wire, a cable, or a rope.

13. The device of claim 1, wherein the tensioned synchronizing element is positioned around the first and second hinge shafts in a figure-eight manner.

14. The device of claim 1, wherein the tensioned synchronizing element is secured to the first portion and the second portion.

15. A device, comprising:
    first and second portions;
    a hinge assembly comprising spaced-apart parallel first and second hinge shafts, the first portion rotatably secured relative to the first hinge shaft and the second portion rotatably secured relative to the second hinge shaft;
    a tensioned synchronizing element that synchronizes rotation of the first portion around the first hinge shaft to rotation of the second portion around the second hinge shaft;
    a first retaining assembly that secures a first portion of the tensioned synchronizing element relative to the first hinge shaft; and,
    a second retaining assembly that secures a second portion of the tensioned synchronizing element relative to the second hinge shaft.

16. A device, comprising:
    first and second portions that rotate through a range of rotation around first and second hinge shafts;
    a cord extending in a figure-eight around the first and second hinge shafts;
    a first retaining assembly that secures a first portion of the cord relative to the first hinge shaft; and,
    a second retaining assembly that secures a second portion of the cord relative to the second hinge shaft to synchronize rotation of the first portion around the first hinge shaft to rotation of the second portion around the second hinge shaft.

* * * * *